US010917363B2

(12) United States Patent
Gopalan et al.

(10) Patent No.: US 10,917,363 B2
(45) Date of Patent: Feb. 9, 2021

(54) MULTILAYER PACKET OPTICAL COMMUNICATION NETWORKS

(71) Applicant: Infinera Corporation, Annapolis Junction, MD (US)

(72) Inventors: Abishek Gopalan, San Jose, CA (US); Snigdho Bardalai, San Ramon, CA (US); Biao Lu, Sunnyvale, CA (US); Onur Turkcu, Saratoga, CA (US); Parthiban Kandappan, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 14/871,165

(22) Filed: Sep. 30, 2015

(65) Prior Publication Data

US 2016/0373205 A1    Dec. 22, 2016

Related U.S. Application Data

(60) Provisional application No. 62/182,842, filed on Jun. 22, 2015.

(51) Int. Cl.
*H04L 12/931* (2013.01)
*H04L 29/08* (2006.01)
*H04J 3/16* (2006.01)

(52) U.S. Cl.
CPC ........... *H04L 49/35* (2013.01); *H04L 69/321* (2013.01); *H04J 3/1658* (2013.01)

(58) Field of Classification Search
CPC ........ H04J 3/0691; H04J 3/1652; H04J 14/02; H04J 14/0201; H04J 14/0206; H04J 14/021; H04J 14/0221; H04J 14/0223; H04J 14/0227; H04J 14/0273; H04J 14/0279; H04J 14/0283; H04J 14/0287; H04J 14/0291; H04J 14/0295; H04J 14/06; H04J 14/076; H04J 14/023; H04J 14/1658; H04J 2203/0003; H04J 2203/0085; H04B 10/5161; H04B 10/572; H04L 29/06; H04L 49/35
See application file for complete search history.

(56) References Cited

U.S. PATENT DOCUMENTS

| | | | |
|---|---|---|---|
| 9,094,129 B2* | 7/2015 | Krause | H04B 10/5053 |
| 9,680,587 B2* | 6/2017 | Abbas | H04J 3/1652 |
| 9,838,296 B2* | 12/2017 | Armolavicius | H04L 41/147 |
| 2005/0114489 A1* | 5/2005 | Yonge, III | H04L 1/0061 709/223 |
| 2006/0228115 A1* | 10/2006 | Binetti | H04J 14/0201 398/83 |
| 2009/0252492 A1* | 10/2009 | Sone | H04L 12/2852 398/49 |
| 2011/0116789 A1* | 5/2011 | Wellbrock | H04J 14/0279 398/5 |
| 2012/0237199 A1* | 9/2012 | Akiyama | H04J 3/14 398/2 |
| 2013/0287396 A1* | 10/2013 | Cavaliere | H04J 14/0227 398/48 |

(Continued)

*Primary Examiner* — Eric Nowlin
(74) *Attorney, Agent, or Firm* — David L. Soltz

(57) ABSTRACT

An optimized communication network may include an edge switch capable of transporting and switching L1 and L2 traffic and configured to selectively transport and switch L2 traffic using L1 protocols.

9 Claims, 3 Drawing Sheets

(56) References Cited

U.S. PATENT DOCUMENTS

| | | | |
|---|---|---|---|
| 2014/0093253 A1* | 4/2014 | Krause | H04B 10/5053 398/184 |
| 2015/0093117 A1* | 4/2015 | Rahn | H04B 10/588 398/115 |
| 2015/0326348 A1* | 11/2015 | Shen | H04L 67/12 714/776 |
| 2016/0065325 A1* | 3/2016 | Cavaliere | H04B 10/5161 398/65 |
| 2016/0087750 A1* | 3/2016 | Kang | H04L 27/2602 398/66 |
| 2016/0182329 A1* | 6/2016 | Armolavicius | H04L 41/0893 370/230 |
| 2016/0191190 A1* | 6/2016 | Mitchell | H04J 14/0212 398/48 |
| 2016/0191191 A1* | 6/2016 | Mitchell | H04J 14/0212 398/48 |
| 2016/0191193 A1* | 6/2016 | Mitchell | H04J 14/0221 398/27 |
| 2016/0192042 A1* | 6/2016 | Mitchell | H04Q 11/0005 398/48 |
| 2016/0315714 A1* | 10/2016 | Awadalla | H04B 10/6165 |

* cited by examiner

MULTILAYER PACKET OPTICAL COMMUNICATION NETWORKS

CLAIM OF PRIORITY UNDER 35 U.S.C. § 120

The present application for patent claims priority to Provisional Application No. 62/182,842 entitled "Multilayer packet optical network designs" filed Jun. 22, 2015, and assigned to the assignee hereof and hereby expressly incorporated by reference herein.

FIELD OF DISCLOSURE

This disclosure relates generally to optical communication networks and more specifically, but not exclusively, to designs for multilayer packet optical communication networks.

BACKGROUND

Conventional communication networks, such as telecommunications networks, are multilayered in accordance with the Open Systems Interconnection (OSI) model. The OSI model is a conceptual model that characterizes and standardizes the communication functions of a telecommunication or computing system without regard of to their underlying internal structure and technology. Its goal is the interoperability of diverse communication systems with standard protocols. The model partitions a communication system into seven abstraction layers. A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer. Layer 0 is the physical layer that defines the electrical and physical specifications of the data connection. It defines the relationship between a device and a physical transmission medium (e.g., a copper or fiber optical cable). Layer 1 is the data link layer that provides node-to-node data transfer—a reliable link between two directly connected nodes, by detecting and possibly correcting errors that may occur in the physical layer. Layer 2 is the network layer that provides the functional and procedural means of transferring variable length data sequences (called datagrams) from one node to another connected to the same network. It translates logical network address into physical machine address. A network is a medium to which many nodes can be connected, on which every node has an address and which permits nodes connected to it to transfer messages to other nodes connected to it by merely providing the content of a message and the address of the destination node and letting the network find the way to deliver ("route") the message to the destination node. Layer 3 is the transport layer that provides the functional and procedural means of transferring variable-length data sequences from a source to a destination host via one or more networks, while maintaining the quality of service functions. Layer 4 is the session layer that controls the dialogues (connections) between computers. It establishes, manages and terminates the connections between the local and remote application. Layer 5 is the presentation layer that establishes context between application-layer entities, in which the application-layer entities may use different syntax and semantics if the presentation service provides a big mapping between them. If a mapping is available, presentation service data units are encapsulated into session protocol data units, and passed down the protocol stack. Layer 6 is the application layer and is the OSI layer closest to the end user, which means both the OSI application layer and the user interact directly with the software application. This layer interacts with software applications that implement a communicating component.

For example, a multilayer network design for carrying packet traffic across core networks includes a packet layer (L2) network consisting of devices such as packet switch modules (PXM) or packet switches. The PXM's are capable of encapsulating packet layer traffic onto optical transport network (OTN) containers such as flexible rate optical data units (ODUFlex), which are switched in the OTN (L1) layer. The OTN layer traffic is in turn carried over an L0 network. In general, devices across these layers are all part of a network and tightly integrated, thereby having infrastructure to design and optimize for network efficiency across layers. The higher up the protocol stack you go, the more functionality you obtain. However, the higher up the protocol stack you go, the more resource intensive and costly the operations become. Thus, there is a need to move operations such as transporting packets from high layers (e.g. layer 2) to lower more cost effective layers (e.g. move layer 2 traffic to layer 1) while maintaining a robust network.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for communication includes: receiving a first signal in a first format at a first device configured to transport signals in a first format and a second format; generating, by the first device, a second signal in the second format based on the first signal; and transmitting, by the first device, the second signal.

In another aspect, an apparatus includes: means for receiving a first signal in a first format at a first device configured to transport signals in a first format and a second format; means for generating a second signal in the second format based on the first signal; and means for transmitting the second signal.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
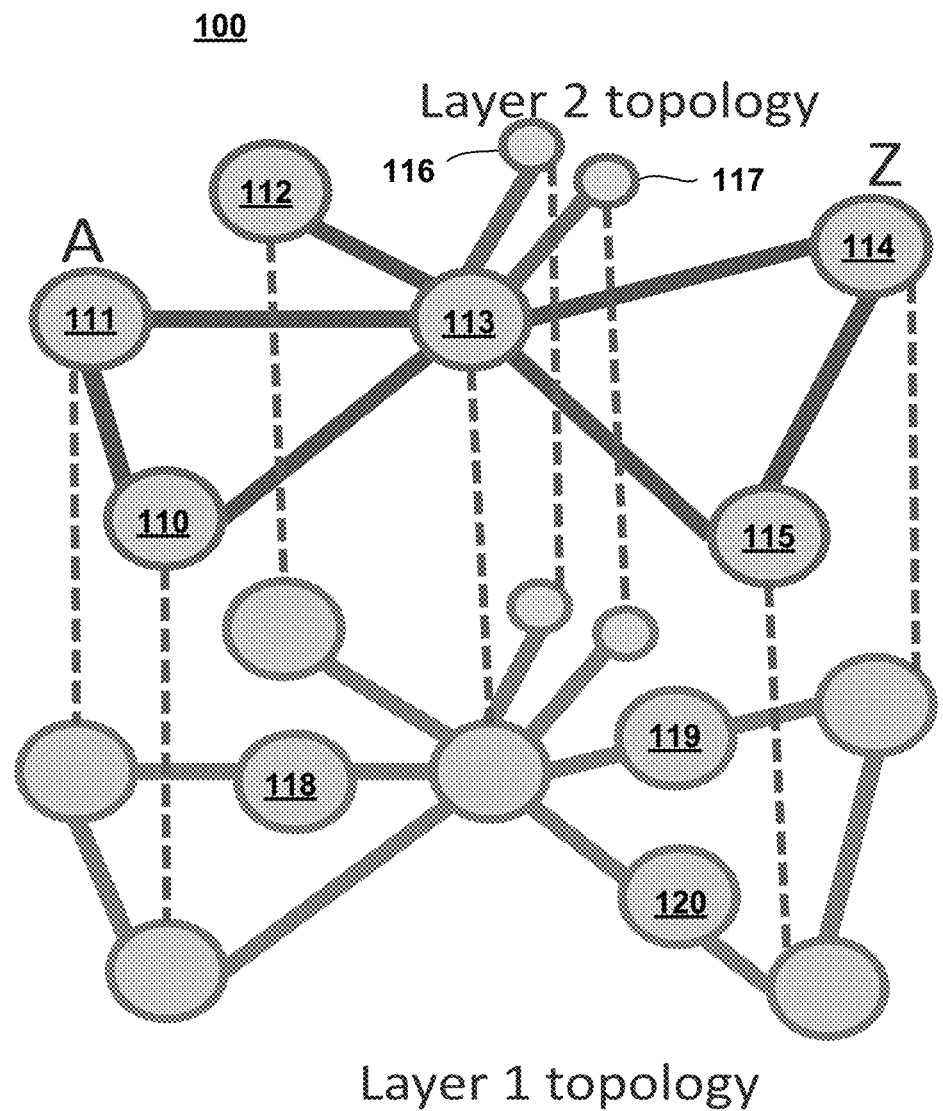
FIG. 1 illustrates an exemplary communication network in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, an optimized network design will utilize more layer 1 switches and bypass or use less layer 2 switches. Thus, if the bandwidth between A-Z exceeds a certain threshold (e.g. 10 G) that also aligns with an L1 container size, then moving this traffic to L1 saves L2 network costs—referred to as 'L2/Router bypass'. This approach does not sacrifice network efficiency since the L1 container is packed tightly without bandwidth wastage. This also keeps a bound on the number of devices and the switching capacity required in the packet core (as opposed to the edges, boundary, or ingress/egress devices of a network) since after a certain traffic growth, some portions of the packet traffic are moved away from the packet switches in the core. The maximum L2 switching capacity required for a network then becomes a function of the 'end points', the 'threshold for bypass' and nearly 'independent of the traffic growth.' This provides a 'thin core' packet network architecture that can scale extremely well with excellent network economics without sacrificing network efficiency.

FIG. 1 illustrates an exemplary communication network in accordance with some examples of the disclosure. As shown in FIG. 1, a communication network 100 may include a layer 1 topology 102 and a layer 2 topology 104 overlying the layer 1 topology 102. Each topology 102 and 104 may include a plurality of devices such as a first device 110, a second device 111, a third device 112, a fourth device 113, a fifth device 114, a sixth device 115, a seventh device 116, and an eighth device 117. While these are shown as the same device for both layer 1 and layer 2, it should be understood that they may be separate devices co-located or remote from each other. In addition, each device may be a network element such as a router, switch, or similar (e.g. a PXM, a large packet switch such as a terabyte switch (EXMP for example), a label switch router (LSR), a tributary interface module (TIM), etc.). In addition, the layer 1 topology 102 may include layer 1 only devices such as a ninth device 118, a tenth device 119, and an eleventh device 120. If the bandwidth between A-Z in the network 100 exceeds a certain threshold (e.g. 10 G) that also aligns with an L1 container size, then moving the A-Z traffic (communication signals travelling between the second device 111 and the fifth device 114) to L1 saves L2 network costs. This may be referred to as 'L2/Router bypass' in which the traffic avoids the L2 device or bypasses the L2 functionality of the device if the L1 and L2 devices are the same device. This approach does not sacrifice network efficiency since the L1 container is packed tightly without bandwidth wastage. This also keeps a bound on the number of devices and the switching capacity required in the network core since after a certain traffic growth, some portions of the packet traffic are moved away from the packet switches in the network core. For instance, the maximum L2 switching capacity required for a network then becomes a function of the 'end points', the 'threshold for bypass' and nearly 'independent of the traffic growth'. This provides a 'thin core' packet network architecture that can scale extremely well with excellent network economics without sacrificing network efficiency. In exemplary configurations to optimize the network 100, the network 100 configuration may be modified to use certain types of devices within the network 100.

For example, a network device (e.g. device 110-120), such as Infinera's DTN-X platform, may include multiple functionalities like L0 wavelength division multiplexing (WDM) transport capabilities, L1 digital OTN switching capabilities, and L2 packet switching capabilities (through the PXM). The network 100 may be optimized by enabling the packet switching feature in PXMs using protocols such as MPLS-TP and switching LSP's, and packet switching in the network core can be performed by the PXM. This configuration may be referred to as the 'All PXM's', 'Pure PXM's', or 'PXMs+LSR'. This allows the network 100 that deploys devices with such a functionality to improve network efficiency by increasing link utilization and approach optimality (a pure packet switching configuration). One such configuration may use tributary interface modules (TIMs) only where L2 services are carried over TIMs end-to-end. In another configuration, the network 100 may use TIMs plus a large packet switch (e.g. EXMP) where L2 services are carried over TIMs but can be switched and groomed in the network core using the large packet switch. In another configuration, the network 100 may use point to point (P2P) PXMs only where L2 services are placed in flexible OTN containers at add/drop locations but are not groomed/switched as they are carried through a core network. In another configuration, the network 100 may use PXMs only (with packet switching capability) where L2 services are placed in flexible OTN containers at add/drop locations but can also be groomed/switched as they are carried through the core network. In another configuration, the network 100 may use PXMs plus a large packet switch where L2 services are placed in flexible OTN containers at add/drop locations, and can be removed from these containers in transit and groomed/switched as they traverse the network core with a larger pure packet switch that works in conjunction with a PXM that creates the containers for optical transport.

Additionally, the network 100 may be further optimized by packet grooming at the edges of the network 100 to increase core network efficiency. In such one configuration, the network 100 may have multiplexers located at the edge that can groom sub-10 G streams and pack them appropriately, which then helps improve core network efficiency. This can be done both from a network planning and design perspective as well from an operational perspective by performing re-optimizations to increase network efficiency continually. In another configuration, the network 100 may have a switch (large or small or combinations) in front of PXM's or a L1 network (e.g. a DTN-X by Infinera) can greatly aid the packing and utilization of the L1 network. This also provides visibility and opportunities to optimize across several PXM's or L1/L0 devices. Once the packet switches at the edges are able to aggregate the smaller granularity Ethernet flows, for example, and pack them to map them exactly or very close to the size of an L1 container, there is no inefficiency in carrying this pipe purely in L1/L0 without wasting L2 switching capacity. These configurations provide many advantages. For example, once A-Z traffic reaches 10 G or some container that can be mapped to a transport pipe (ODUn) efficiently, that traffic may be moved to bypass the packet core. This allows the packet core to remain thin and does not require huge capacity packet switches. It also keeps the core switching capacity available for the incoming or future services and, also for residual traffic that may not fit appropriately into an ODUFlex and hence may require packet switching in the core to improve network efficiency.

Figure 2A:
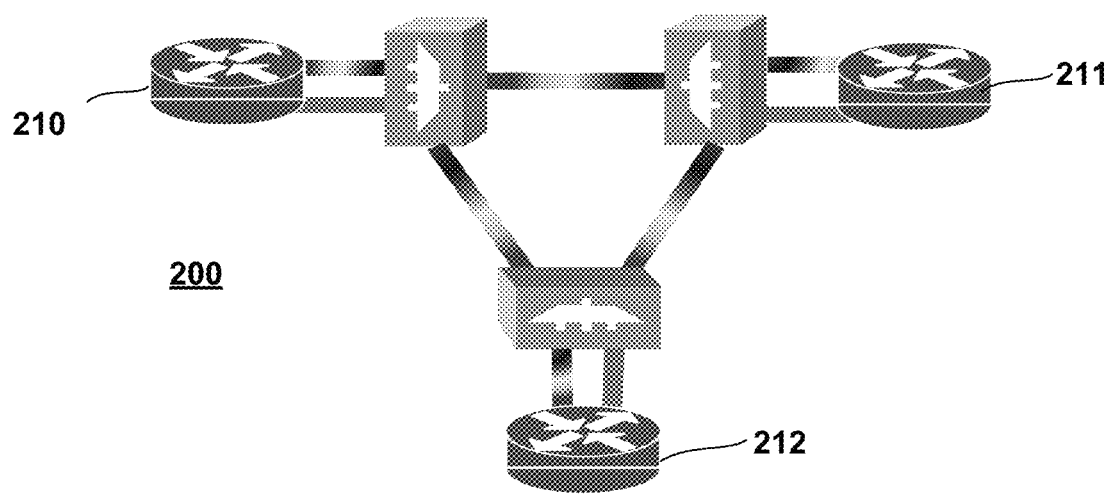
FIGS. 2A-C illustrate exemplary alternative communication network configurations in accordance with some examples of the disclosure.
Figure 2B:
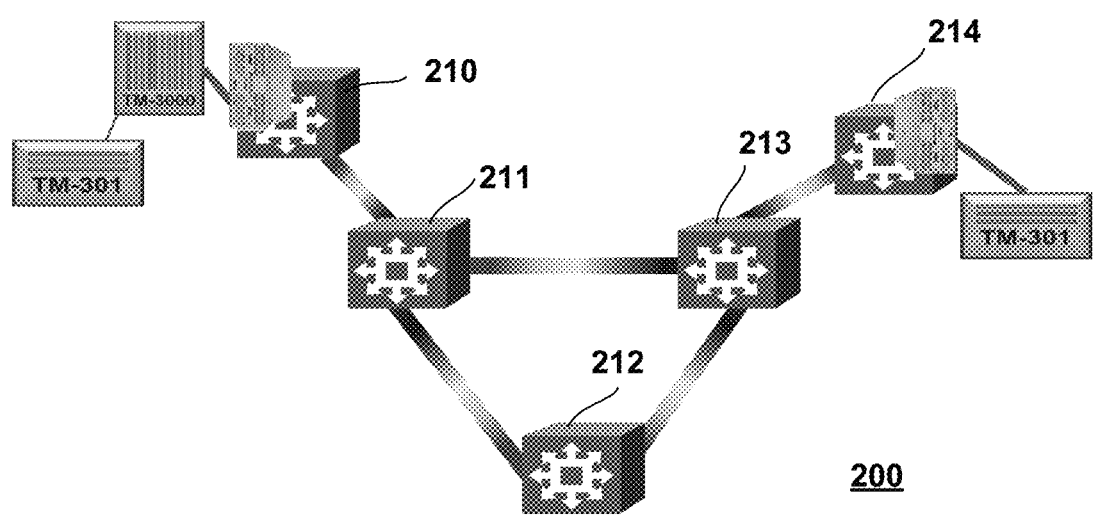
Figure 2C:
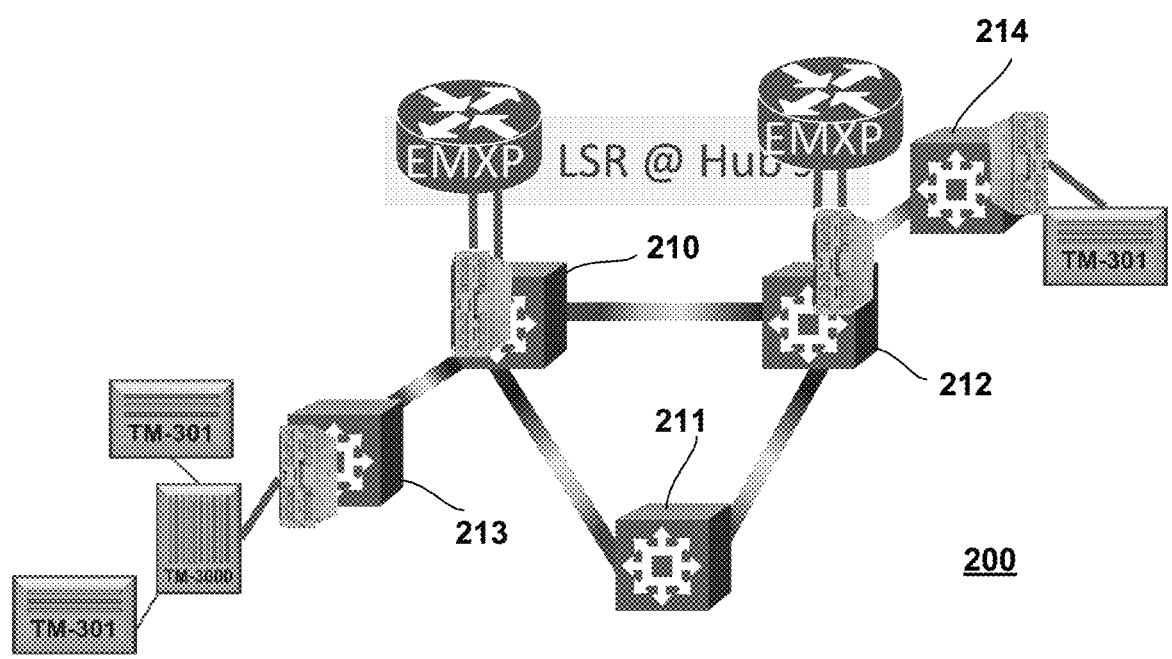

FIGS. 2A-C illustrate exemplary alternative communication network configurations described above in accordance with some examples of the disclosure. As shown in FIG. 2A, a network 200 may be a pure PXM network with very little bandwidth inefficiencies. For example, the network 200 may include a first device 210 coupled to a second device 211 and a third device 212 that are also coupled with each other. The first device 210, the second device 211, and the third device 213 may be configured to transport and switch both L1 and L2 communication signals and selectively transport and switch L2 communication signals using L1 transport protocols. As shown in FIG. 2B, a network 200 that may include a first device 210 coupled to a second device 211, a third device 212 coupled to the second device 211 and a fourth device 213, and a fifth device 214 coupled to the fourth device 213. In one configuration of FIG. 2B, the first device 210 and the fifth device 214 are edge devices that may be an OTN switch with a 10 G TIM configured to transport L2 communication signals. In another configuration of FIG. 2B, the first device 210 and the fifth device 214 are edge devices that may have a PXM instead of the 10 G TIM with the PXM configured to transport and switch L1 and L2 communication signals and selectively transport and switch L2 communication signals using L1 transport protocols (e.g. Transmode packet optical transport 3000 or 301). In one configuration of FIG. 2B, the Transmode packet optical devices sit further out on the edges, aggregating low-rate traffic and may then be connected to a DTN-X, for example, at the edges (with or without the PXMs). The characteristic of this configuration is that their is no packet switching (L2) in the core of the network but some combination of packet switching enabled at the edges (e.g. DTN-X and Transmode as shown in FIG. 2B).

As shown in FIG. 2C, a network 200 may include a first device 210 coupled to a second device 211, a third device 212 coupled to the second device 211 and the first device 210, a fourth device 213 coupled to the first device 210, and a fifth device 214 coupled to the third device 212. In one configuration of FIG. 2C, the fourth device 213 and the fifth device 214 are edge devices that may include a PXM configured to transport and switch L2 communication signals and selectively transport and switch L2 communication signals using L1 transport protocols (e.g. Transmode packet optical transport 3000 or 301) along with PXMs in core locations such as the first device 210 and the third device 212 configured to perform packet switching. In another configuration of FIG. 2C, the core locations such as the first device 210 and the third device 212 may have large capacity switches (e.g. 800 G capacity or larger, EMXP) instead of PXMs and co-located with an OTN switch. In still another configuration of FIG. 2C, the fourth device 213 and the fifth device 214 are edge devices that may be a an OTN switch with a 10 G TIM configured to transport and switch L2 communication signals (e.g. Transmode packet optical transport 3000 or 301) along with large capacity switches (e.g. 800 G capacity or larger, EMXP) instead of PXMs and co-located with an OTN switch in core locations such as the first device 210 and the third device 212 configured to perform packet switching.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for communication, the method comprising:
   receiving a first signal in a first format at a first device configured to transport signals in the first format and a second format, the first format being lower in an open system interconnection model protocol than the second format;
   generating, by the first device, a second signal in the second format by encapsulating the first signal in the second format;
   transmitting, by the first device, the second signal onto a link, the first and second signals being optical signals;
   determining that a bandwidth associated with the second signal exceeds a threshold; and
   transmitting, by the first device, a third signal onto the link when the bandwidth associated with the second signal exceeds the threshold, the third signal having the first format, wherein the third signal is a layer L1 signal and the second signal is a layer L2 signal.

2. The method of claim 1, wherein the first device is logically located at an ingress-egress point of a communication network.

3. The method of claim 1, further comprising:
receiving a third signal in the first format at the first device; and
transmitting, by the first device, the third signal.

4. A network, comprising:
a first device and a second device, the first device receiving a first signal in a first format, the first device being configured to transport signals in the first format and a second format, the first format being lower in an open system interconnection model protocol than the second format;
the first device generating a second signal in the second format by encapsulating the first signal in the second format, the first device transmitting the second signal over a link to the second device, the first and second signals being optical signals,
determining that a bandwidth associated with the second signal exceeds a threshold, and
the first device transmitting a third signal onto the link when the bandwidth associated with the second signal exceeds the threshold, the third signal having the first format, wherein the third signal is a layer L1 signal and the second signal is a layer L2 signal.

5. The network of claim 4, wherein the first device is logically located at an ingress-egress point of the network.

6. The network of claim 4,
wherein the first device receives a fourth signal in the first format; and
transmits the fourth signal to the second device.

7. A non-transitory computer readable medium containing program instructions for causing a processor to perform a process comprising:
receiving a first signal in a first format at a first device configured to transport signals in the first format and a second format, the first format being lower in an open system interconnection model protocol than the second format;
generating, by the first device, a second signal in the second format by encapsulating the first signal in the second format,
transmitting, by the first device, the second signal over a link, the first and second signals being optical signals;
determining that a bandwidth associated with the second signal exceeds a threshold; and
transmitting, by the first device, a third signal onto the link when the bandwidth associated with the second signal exceeds the threshold, the third signal having the first format, wherein the third signal is a layer L1 signal and the second signal is a layer L2 signal.

8. The non-transitory computer readable medium of claim 7, wherein the first device is logically located at an ingress-egress point of a communication network.

9. The non-transitory computer readable medium of claim 7, the process further comprising:
receiving a fourth signal in the first format at the first device; and
transmitting, by the first device, the fourth signal.

* * * * *